Jan. 5, 1926.

I. DROLSHAMMER 1,568,368

VALVE MECHANISM FOR COMPRESSED AIR BRAKES

Filed Nov. 7, 1924  2 Sheets-Sheet 1

Fig. 1ᵃ

Inventor:
Ivar Drolshammer
B. Singer, Atty.

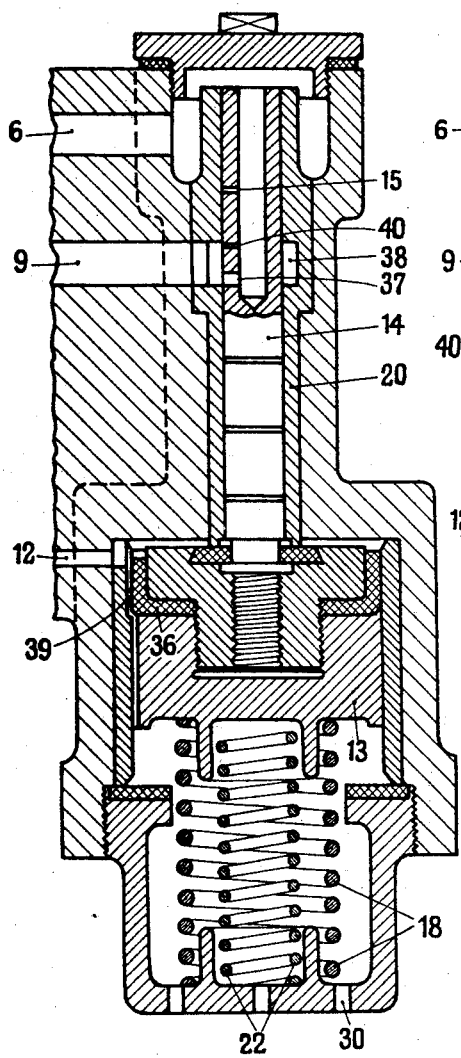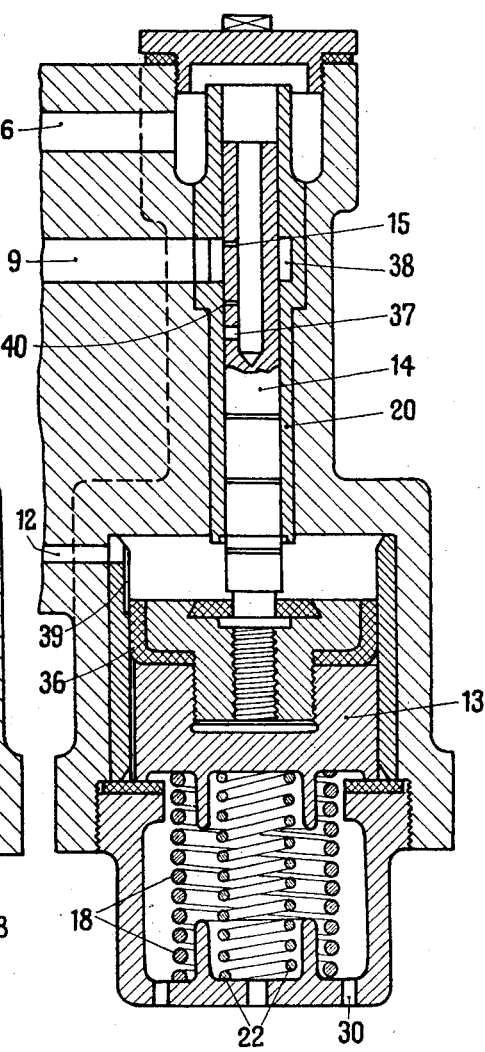

Patented Jan. 5, 1926.

1,568,368

UNITED STATES PATENT OFFICE.

IVAR DROLSHAMMER, OF DRAMMEN, NORWAY.

VALVE MECHANISM FOR COMPRESSED-AIR BRAKES.

Application filed November 7, 1924. Serial No. 748,493.

*To all whom it may concern:*

Be it known that I, IVAR DROLSHAMMER, a subject of the King of Norway, residing at Drammen, Norway, have invented certain new and useful Improvements in Valve Mechanism for Compressed-Air Brakes; and I hereby declare that the following is a full, clear, and exact description of the same.

The invention relates to valve mechanism for compressed air brakes, and more particularly to a supplementary controlling valve for influencing the charging pressure of the brake cylinder, so that a graph illustrating the progress of charging has two breaks, for a purpose to be explained hereinafter. The supplementary valve is influenced by the brake cylinder pressure, and in the course of its movement in one direction it successively uncovers a series of ports, to open air passage which are substituted for, or made supplementary to, the passages directly controlled by the main valve. The passages controlled by the supplementary valve are of different sizes, so that, for example a large one is succeeded by a very small one, or by a blank, which in turn is succeeded by a port somewhat larger than the intermediate one, but still small.

Preferably the supplementary valve is not placed, as was heretofore usual, in the path between the main valve and the cylinder, but is placed so that there are two air paths, one direct and the other by way of the supplementary valve.

In the preferred form the main controlling valve is one which affords static regulation, and this may be a "Drolshammer" valve, but other types may be used, especially valves which are also regulatable as regards the return movement and valves wherewith the cylinder pressure is maintained in spite of such leakage as may occur.

Figure 1:
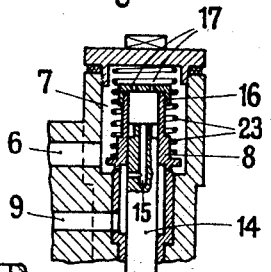
Figure 1:
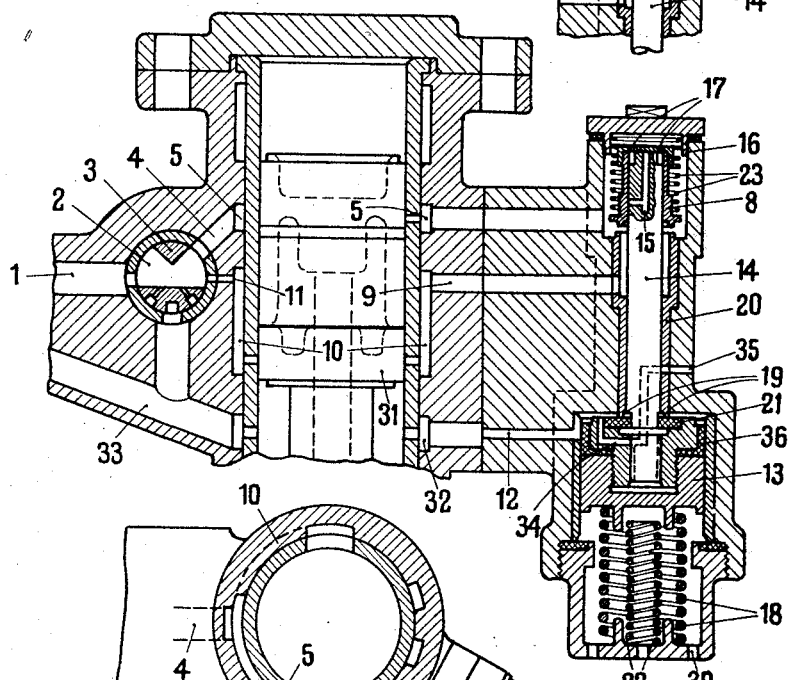

Two embodiments of the invention are shown in the accompanying drawings, in Figs. 1, 1ª and 2, and in Figs. 3 and 4 respectively.

Referring first to Figs. 1, 1ª and 2, compressed air from an auxiliary reservoir not shown flows through the conduit 1, the large passage 2 of the valve plug 3, and the throttling orifice 11 to the annular chamber 10 in front of the main piston valve 31. This is the direct path. At the same time there is a passage through conduit 4, annular chamber 5, and conduit 6 to the chamber 7 in the supplementary valve. The valve 8 being lifted, the air flows by way of the conduit 9 to the chamber 10, this being the indirect path which, as will be seen rejoins the direct path. The space above the piston 13 controlling the supplementary valve is permanently and directly connected to the brake cylinder (not shown) by a conduit 12, 32 and a conduit 33, the space below the piston being open to the atmosphere by way of holes 30. The piston rod 14 has at the top a duct 15, closed in the position shown in Fig. 1 by a sleeve guiding the valve 8. This sleeve is closed at the top by a cap 16, so that when the piston 13 ascends the valve is opened by the rod 14. The cap has passages 17, so that when the valve 8 is closed and the conduit 15 is open, air can flow to the conduit 9 and the space in front of the piston valve 31. With the piston 13 in the position shown in Fig. 1, that is with the brake off, the piston is held by the spring 18 against the valve seat 19 of the sleeve 20, the leather washer 21 of the piston 13 forming an auxiliary packing. The spring is loaded so that the piston 13 does not begin to move down till a predetermined cylinder pressure, say about 5 atm. is reached. The supplementary spring 22 is so arranged that the piston 13 can descend sufficiently for fully effective closure of the valve 8 before compression of the spring 22 begins. The piston 13 has a duct 34 leading through the rod 14, which in the top position registers with a transverse bore open to atmosphere.

On starting the application of the brake compressed air flows by both paths indicated to the chamber in front of the piston valve 31, and thence at a high rate to the brake cylinder. At about 5 atm. pressure in the cylinder the piston 13 is depressed and the valve 8 goes with it, overcoming its spring 23 and cutting off communication between conduits 6 and 9, so that the air flow to the brake cylinder is reduced. The inflow of air is then solely by the direct path, including the throttling orifice 11, and the cylinder pressure increases only. The piston 13 continues to descend, compressing the spring 22. When all the coaches or trucks have been braked, and a further rapid increase of cylinder pressure can take place without causing bumping, the piston 13 has so far descended that the passage 15 is opened (Fig.

1ª), and air can flow through passages 17, 15 and 9 to the main valve and cylinder. The cylinder pressure then rises quickly. The brake is thus materially shortened. In case of slight leakage the leather cup 36 ensures that nevertheless the full pressure is attained.

The purpose of the direct connection of the chamber above the piston 13 to the atmosphere, by way of ducts 34 and 35 is as follows.

The time required for release of the brakes for example 30 seconds, makes it necessary for the brake piston to move back quite slowly, though the controlling valve may be already in position for full release, because the air propelled by the piston must be exhausted through a small orifice, and the spring must overcome friction. Hence even a slight additional back pressure may have a marked result. In order to accelerate this return movement I arrange that at a cylinder pressure of, say 1 atm. the supplementary valve opens an additional exhaust passage. This also has the effect that the brake will be released even if at the said cylinder pressure of 1 atm. the controlling valve is moved back to its closed position.

Figure 2:
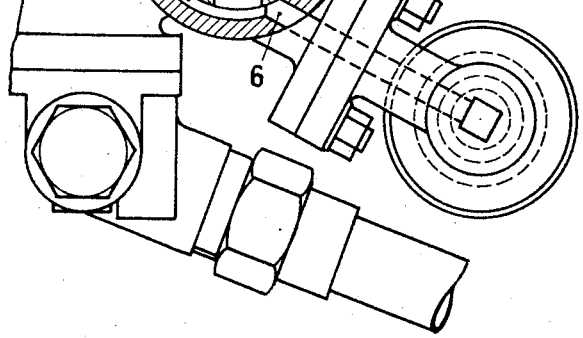

In the modification shown in Figs. 3 and 4 the valve 8 referred to in connection with Figs. 1 and 2 is dispensed with, the piston rod 14 having, in addition to the passage 15, transverse passages 27 and 40. In the top position the wide passage 37 registers with the inlet to the chamber 38 joined to the conduit 9. In the intermediate position only the very small passage 40 is open. The throttle orifice 11 in the valve 3 may be dispensed with, and the passages may be controlled, for regulating rate of action, by the supplementary valve alone, provided that there is only one brake cylinder, or that it is never necessary to cut out one or more of a plurality of cylinders, and that the brake is also used for one class of work, say always for passenger trains, or always for goods trains.

The guide 20 of the rod 14 is sufficiently long to afford an air-tight joint. Instead of the orifice 35 there is a small groove 39 in the cylinder containing the piston 13.

With the supplementary valve described, the length of the charging period and the time required for release of the brake are independent of each other, and the release may be much quicker than heretofore.

What I claim is:—

1. In compressed air brake mechanism the combination of a train pipe, a brake cylinder, an auxiliary reservoir, a brake main valve controlling the flow of air to the brake cylinder and a supplementary valve operated by the air pressure in the brake cylinder and a series of ports controlled by said supplementary valve whereby the rate of charging the brake cylinder is varied in the course of the charging operation.

2. Brake mechanism as claimed in claim 1, the series of ports including a large port, a small port, and a port of intermediate size, opened by the supplementary valve in the order stated.

3. Brake mechanism as claimed in claim 1, wherein the supplementary valve is disposed in a supplementary air path leading to the controlling piston of the main valve.

4. Brake mechanism as claimed in claim 1, wherein the supplementary valve, operating concurrently with the opening of direct air paths by the main valve, first opens a large indirect air passage, then fully closes the indirect air path, and then opens an indirect air passage smaller than the said large passage.

5. Brake mechanism as claimed in claim 1, wherein the supplementary valve is actuated by a piston in a chamber having direct communication in front of the piston, to the brake cylinder, and having a small exhaust port which is controlled by the piston and is closed at the beginning of the supplementary valve movement.

6. Brake mechanism as claimed in claim 1, wherein the supplementary valve is controlled by a piston having in its path two springs one of which operates alone, during part of the piston movement, and collectively with the other during the remainder of the piston movement.

7. Brake mechanism as claimed in claim 1, wherein the series of ports is disposed along a piston rod having a longitudinal duct and transverse ducts.

In testimony whereof, I have signed my name to this specification at Vienna this 16 day of October 1924.

IVAR DROLSHAMMER.